(12) United States Patent
Imamura et al.

(10) Patent No.: US 6,330,415 B1
(45) Date of Patent: Dec. 11, 2001

(54) DEVELOPING DEVICE AND MAGNET ROLLER FOR DEVELOPING DEVICE

(75) Inventors: Tsuyoshi Imamura; Kyohta Koetsuka; Kenichi Ishiguro, all of Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/577,156

(22) Filed: May 24, 2000

(30) Foreign Application Priority Data

May 24, 1999 (JP) .................................................. 11-143256

(51) Int. Cl.⁷ .................................................... G03G 15/09
(52) U.S. Cl. ............................................................ 399/277
(58) Field of Search .................................. 399/274, 275, 399/277, 267; 492/8, 17, 18

(56) References Cited

U.S. PATENT DOCUMENTS

| | | | |
|---|---|---|---|
| 3,945,343 | * | 3/1976 | Berkowitz . |
| 4,583,490 | * | 4/1986 | Kan et al. ............................ 399/275 |
| 4,641,946 | * | 2/1987 | Forbes, II ............................ 399/164 |
| 5,070,812 | * | 12/1991 | Yamaji ................................. 399/270 |
| 5,244,741 | | 9/1993 | Nagano et al. . |
| 5,469,245 | * | 11/1995 | Aoshima et al. ..................... 399/270 |
| 5,970,294 | | 10/1999 | Narita et al. . |
| 5,991,585 | | 11/1999 | Nakamura . |
| 6,081,684 | * | 6/2000 | Naganuma et al. .................. 399/275 |
| 6,198,895 | * | 3/2001 | Tsuda et al. ......................... 399/267 |

FOREIGN PATENT DOCUMENTS

| | | |
|---|---|---|
| 0 469 876 | 2/1992 | (EP) . |
| 2 316 769 | 3/1998 | (GB) . |
| 02-273770 | * 11/1990 | (JP) . |
| 06-258953 | * 9/1994 | (JP) . |
| 11-167285 | * 6/1999 | (JP) . |

OTHER PUBLICATIONS

Patent Abstracts of Japan, vol. 011, No. 283 (P–615), Sep. 12, 1987, JP 62–079482, Apr. 11, 1987.
Patent Abstracts of Japan, vol. 012, No. 144 (P–697), May 6, 1988, JP 62–264078, Nov. 17, 1987.
Patent Abstracts of Japan, vol. 006, No. 141 (P–131), Jul. 30, 1982, JP 57–062078, Apr. 14, 1982.
Patent Abstracts of Japan, vol 009, No. 006 (P–326), Jan. 11, 1985, JP 59–154473, Sep. 3, 1984.

* cited by examiner

*Primary Examiner*—Robert Beatty
(74) *Attorney, Agent, or Firm*—Oblon, Spivak, McClelland, Maier & Neustadt, P.C.

(57) ABSTRACT

A developing device which prevents bias of a developer caused by an axial magnetic force of a magnet roller, and which can form an image uniform in the axial direction; and a magnet roller for a developing device which is used in the above developing device and is reduced in axial magnetic force. The developing device includes a rotatable sleeve which carries a developer on the surface thereof, a fixed magnet roller which is provided within the sleeve and has a plurality magnetic poles, and a doctor blade which controls the amount of developer carried on the sleeve. The developing device is constructed so that among the plurality of magnetic poles of the magnet roller, the ratio of the axial magnetic flux density to the radial magnetic flux density of a magnetic pole opposing the doctor blade is 2.5/100 or less in a central portion in the axial direction.

17 Claims, 6 Drawing Sheets

FIG.3(a) FIG.3(b)
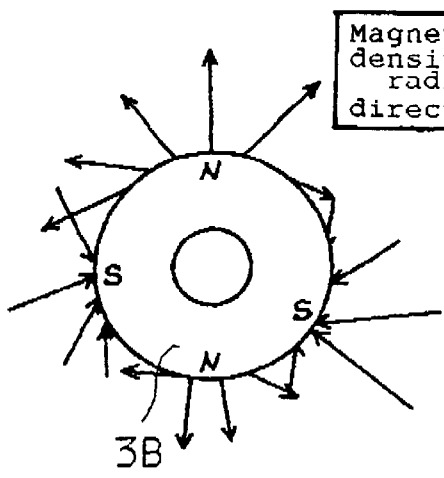
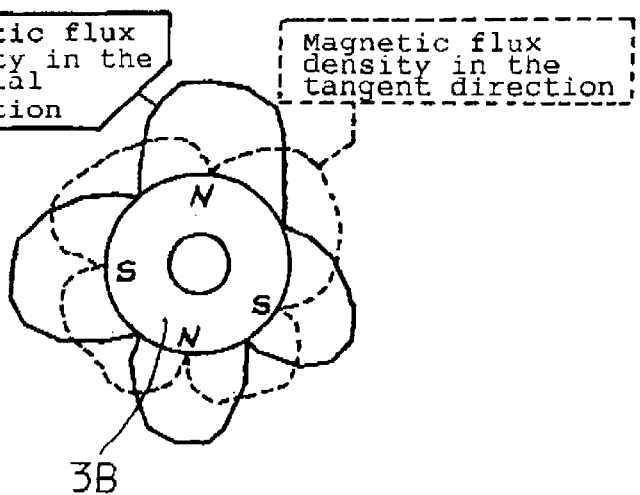
FIG.4
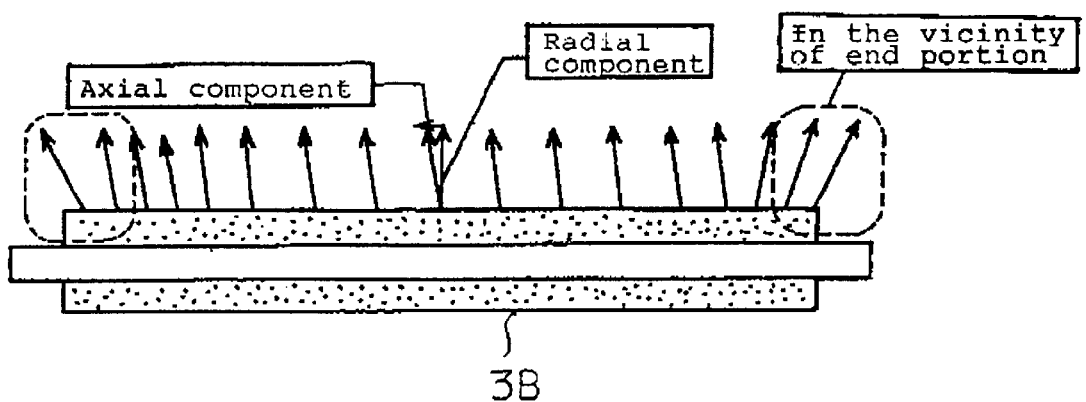

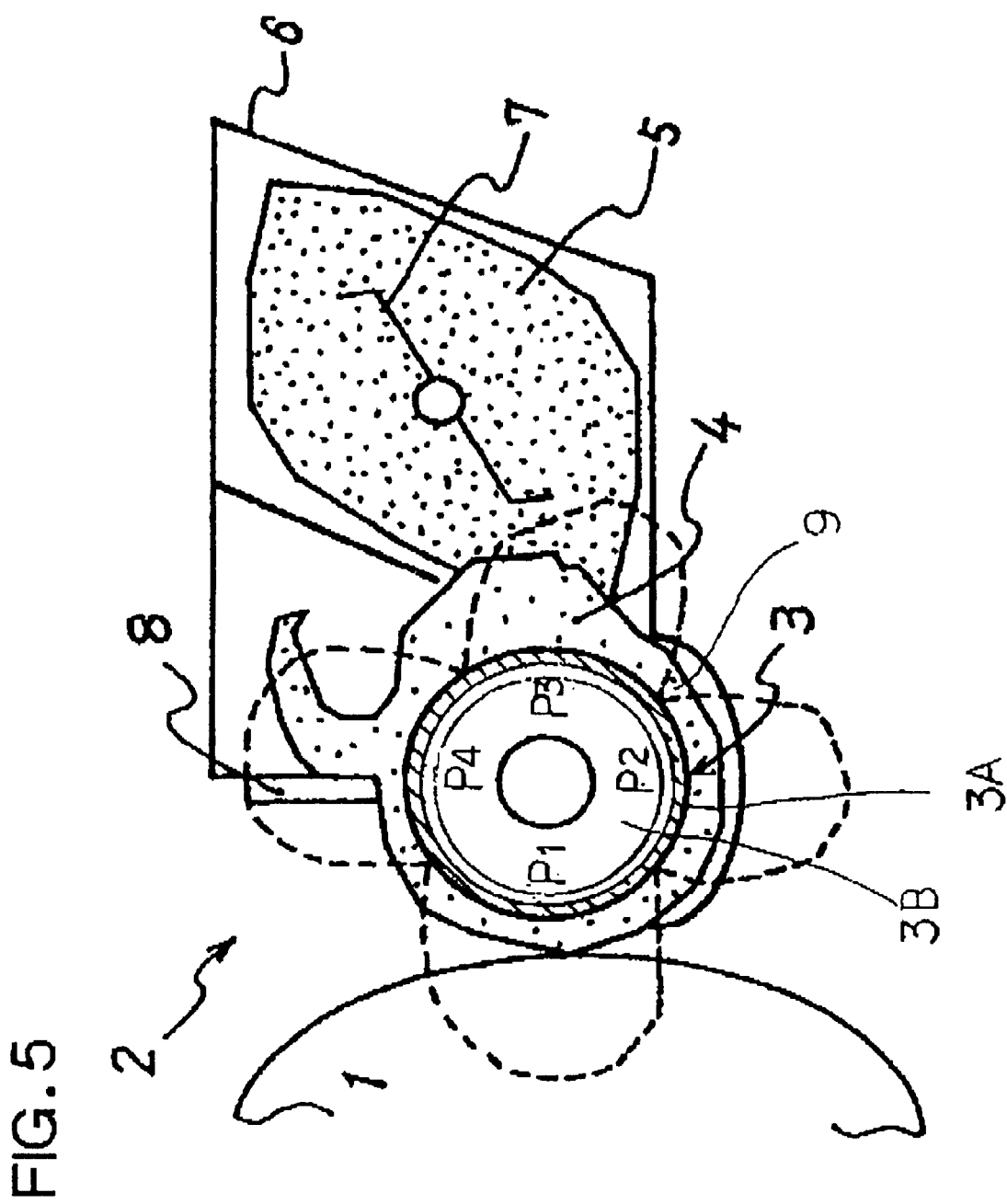

DEVELOPING DEVICE AND MAGNET ROLLER FOR DEVELOPING DEVICE

BACKGROUND OF THE INVENTION

1. Field of the Invention

The present invention relates to a developing device used for image forming devices such as copying machines, facsimiles, or printers, and to a magnet roller used for the developing device.

2. Detailed Description of the Related Art

Conventionally, there have been known image forming devices, such as copying machines, facsimiles or laser printers, which make visible an electrostatic latent image formed on an image carrying body and which obtain a recorded image. There are developing devices used for such image forming devices which adopt a magnet roller as a developer carrying body. The magnet roller, which carries and transfers a developer by means of magnetic force, is widely used because it has an advantage in that it is stable in view of environmental change and it supports high speed, compared to a non-magnetic roller which carries and transfers the developer using only static electricity. There are two types of developers used for the developing device: a type which uses a magnetic toner, and a type which uses a two-component developer comprised of a magnetic carrier and a non-magnetic toner. The developer is suitably selected according to the developing speed, image quality and the like of the image forming device.

As a representative developing device, there is known the developing device which carries and transfers a two-component developer by means of a developing roller comprised of a rotatable sleeve enveloping inside a fixed magnet (i.e., a magnet roller). In this developing device, the following operations are carried out.

1. (Lift Up) The developer is attracted onto the sleeve by the magnetic force of the magnet.
2. (Transfer) A developer controlling member (hereinafter called a doctor blade) is made to contact the developer on the rotating sleeve or arranged to the developer through a gap to control the amount of developer on the sleeve.
3. (Development) The developer is napped in a developing region opposing an image carrying body, and a static latent image is developed upon the image carrying body.
4. (Recovery) The developer is transferred into the developing device.
5. (Detachment of Developer) The developer is detached from the sleeve, and is returned into the developing device.

In order to carry out the above operations, the developing roller generates a magnetic field alike the one shown in a sectional view of FIG. 3(a). The radial magnetic flux density of the developing roller and the magnetic flux density in the tangent direction thereof are controlled to be in an appropriate range. (Refer to FIG. 3(b).

Further, among these developing devices, in order to realize size reduction, there has been proposed a type, as shown in FIG. 1, which does not comprise a developer stirring member for stirring the developer in the axial direction.

In this type of developing device, the supplied toner and the developer is stirred by the movement of a magnetic carrier caused by the magnetic force of the magnet roller and rotation of the sleeve.

The magnetic field generated by the magnet roller has a magnetic force component in the axial direction. FIG. 4 shows a vector of the axial magnetic flux density of the magnet roller. When the magnet roller has a magnetic force in the axial direction, the movement of the developer differs, even if the radial magnetic flux density of the magnet roller and the magnetic flux density in the tangent direction are the same. The developer is drawn and moved in the axial direction by the axial magnetic force of the magnet roller. Although the developer is moved only slightly, repetitive movement over time will result in a large amount of movement which cannot be ignored, and there occurs a bias, in the axial direction, in the amount of developer being carried or in the concentration of the toner. If such a bias of the developer in the axial direction becomes large, a difference in developing ability will occur, and an uneven image in the axial direction will be formed. Particularly, as shown in FIG. 1, in the developing device which does not comprise a developer stirring member for stirring the developer in the axial direction, since the developer is stirred only by the magnetic force of the magnet roller and the movement of the magnetic carrier caused by rotation of the sleeve, the influence of the axial magnetic force becomes large.

The above-described bias of the developer caused by the axial magnetic force of the magnet roller becomes notable when controlling the amount of the developer on the sleeve with the doctor blade of the developing device. This is because the developer, except for the developer which has passed through the gap between the sleeve and the doctor blade, is not held instantly by the sleeve because it comes into collision with the doctor blade, and the developer is in a condition where it is subjected to only the magnetic force of the magnet roller, as shown in FIG. 2. In such a condition, the developer is easily moved because of the axial magnetic force of the magnet roller. Such repetitive movement of the developer causes a notable bias of the developer in the axial direction.

Further, the bias of the developer, caused by the axial magnetic force of the magnet roller, also occurs in the vicinity of a developing region. In front of the developing region wherein the magnet roller and an image carrying body oppose each other, there is brought about a condition called an agent build-up where the developer having been transferred piles up. The developer in this agent build-up portion is likely to be subjected to an influence caused by the axial magnetic force, compared to the developer held by the sleeve. Thus, the bias of the developer, caused by the axial magnetic force of the magnet roller, is brought about also in the vicinity of the developing region.

The reasons why the magnet roller possesses an axial magnetic force are that: a magnetic circuit is formed at the end portion of the magnet roller, specifically in an area about 30 mm from the end surface thereof, because the magnetic field is turned at the end portion (see FIG. 4); and the direction of ferrite oriented into a resin of the magnet roller forms an angle with reference to the axial direction. The former is inevitable because of the shape of the magnet roller, and is difficult to avoid. The latter is deeply related to a molding step in a manufacturing process of the magnet roller.

A method of manufacturing a magnet roller is such that the roller is molded while orienting ferrite into a resin in the axial direction, generally according to magnetic field-injection molding or magnetic field-extrusion molding. In the case of magnetic-field injection molding, a variation in the orientation of ferrite is caused by the way the resin flows or because of pressure distribution under a pressure-dwelling condition. Among these causes, the pressure distribution is difficult to control; and therefore, in magnetic field-injection molding, it is difficult to keep ferrite from orienting with an angle with reference to the axial direction and to reduce the axial magnetic force of the magnet roller.

As for magnetic field-extrusion molding, a variation in ferrite orientation is caused by resin flow. FIG. 7(a) is a diagram explaining the flow of resin in magnetic field-press molding. A mixture of ferrite 11 and resin 10 is squeezed from a head 12 towards an orientation die 13 for orientating the ferrite 11 (see FIG. 7(b)). FIG. 7(b) is a diagram explaining the flow of resin within the orientation die, and the direction of ferrite. When squeezing the mixture of ferrite 11 and resin 10 from the head 12 towards the orientation die 13, the resin 10 flows from the outside towards the central portion, and because of this flow, at the entrance of the orientation die 13, the resin 10 turns into a parallel flow having a velocity gradient, that is, a shear flow 15. Further, within the orientation die 13, if there is a temperature gradient of the resin 10 or a frictional force with the orientation die 13, these tend to increase the shear flow 15. Because of this shear flow 15, the ferrite 11 in the resin orientates with an angle with reference to the axial direction, and an axial magnetic force component is generated in the magnet roller molded product 16. (See FIG. 8.)

SUMMARY OF THE INVENTION

The present invention has been made in view of the above-mentioned problems, and a first object is to provide a developing device which is capable of preventing a bias of a developer caused by the axial magnetic force component of a magnet roller, and forming an image being uniform in the axial direction. Further a second object is to provide a magnet roller for a developing device which is used in the above-described developing device and has a decreased axial magnetic force component.

In order to achieve the first object, the invention claimed in claim 1 is a developing device comprising a rotatable sleeve for carrying a developer on the surface thereof, a fixed magnet roller provided within the sleeve and having a plurality magnetic poles, and a developer control member for controlling the amount of developer carried on the sleeve, wherein the developing device being characterized in that among the plurality of magnetic poles of said magnet roller, a ratio of an axial magnetic flux density to a radial magnetic flux density of a magnetic pole opposing said developer control member is 2.5% or below in a central portion in the axial direction.

In the developing device of claim 1, the ratio of the axial magnetic flux density to the radial magnetic flux density of a magnetic pole opposing the developer control member is 2.5% or below in a central portion in the axial direction excluding a region in an end portion of the magnet roller, specifically a region where there is generated an axial magnetic force component caused by turning of a magnetic field ascribable to the shape thereof; and thus, the axial magnetic force is decreased. The change over time in the amount of developer in the axial direction is shown in FIGS. 6(b) and (c) for the developing device using such a magnet roller in which the axial magnetic force of the magnetic pole opposing the developer control member is decreased. In such a developing device, the developer, which is not instantly held by the magnet roller because it comes into collision with the developer control member, and thus is subjected only to the magnetic force of the magnet roller, is reduced from being moved in the axial direction. Further, it became clear that in the developing device shown in FIGS. 6(b) and (c) using a magnet roller wherein the axial magnetic force of the magnetic pole opposing the developer control member is reduced, the bias of the developer in the axial direction is within an allowable range over time. On the other hand, as shown in FIG. 6(a), in a developing device using a magnet roller wherein the ratio of the axial magnetic flux density to the radial magnetic flux density of a magnetic pole opposing the developer control member is over 2.5%, it became clear that since the developer is moved repetitively by axial magnetic force, the bias of the developer in the axial direction goes beyond an allowable range over time. Therefore, in the developing device using the magnet roller wherein the ratio of the axial magnetic flux density to the radial magnetic flux density of a magnetic pole opposing the developer control member is 2.5% or below in the central portion in the axial direction, the axial bias of the developer is reduced from occurring, and it is possible to form an image being uniform in the axial direction.

Further, the invention of claim 2 is a developing device according to claim 1 characterized in that, among the magnetic poles of said magnet roller, a ratio of the axial magnetic flux density to a radial magnetic flux density of a magnetic pole to be a developing pole is 2.5% or below in the central portion in the axial direction.

In the developing device of claim 2, the ratio of the axial magnetic flux density to the radial magnetic flux density of the developing pole is 2.5% or below in a central portion in the axial direction, and thus, the axial magnetic force of the developing pole is reduced. Therefore, since there is used a magnet roller wherein the axial magnetic force of the developing pole is reduced in addition to the axial magnetic force of the magnetic pole opposing the developer control member, the developer, even in a portion where the developer builds up in the vicinity of a developing region, is reduced from moving axially. Thus, the axial bias of the developer is further reduced from occurring, and it is possible to form an image which is uniform in the axial direction.

Further, the invention of claim 3 is a developing device according to claim 1 characterized in that a ratio of the axial magnetic flux density to a radial magnetic flux density of each of the magnetic poles of said magnet roller is 2.5% or below in the central portion in the axial direction.

In the developing device of claim 3, the ratio of the axial magnetic flux density to the radial magnetic flux density of each of the magnetic poles is 2.5% or below in a central portion in the axial direction, and thus, the axial magnetic force of all of the developing poles is reduced. Therefore, since there is used a magnet roller wherein the axial magnetic force of all of the magnetic poles is reduced, the developer is reduced from moving axially throughout the peripheral direction of the magnet roller. Thus, the axial bias of the developer is further reduced from occurring, and it is possible to form an image which is uniform in the axial direction.

Further, the invention of claim 4 is a developing device according to either claims 1, 2 or 3 characterized in that it does not comprise a developer stirring member for stirring the developer in the axial direction.

In the developing device of claim 4, since a magnet roller having a small axial magnetic force is used even for the developing device which does not comprise a developer stirring member for stirring the developer in the axial direction, the axial bias of the developer is reduced, and it is possible to form an image which is uniform in the axial direction.

In order to achieve the above-described second object, the invention claimed in claim 5 is a magnet roller used in the developing device according to either claims 1, 2, 3 or 4 which is characterized in that it is molded and manufactured by orienting ferrite into ethylene-ethyl acrylate copolymer (EEA) according to magnetic field-press molding.

In the magnet roller for a developing device of claim 5, the axial magnetic force is reduced by molding and manufacturing the magnet roller by using a resin which can reduce shear flow when carrying out magnetic field-press molding. Generally, when the resin is used in an appropriate low-flow range, a velocity gradient occurring at an entrance of an orientation die is gradually relieved, and thus, the shear flow is reduced. That is, in order to reduce the shear flow, it is necessary to use the resin in the above-described appropriate low-flow range. FIG. 9 shows a temperature characteristic of a flowability of the resin. Since the flowability of the resin possesses a temperature characteristic, it is important to control the temperature of the resin in order to use the resin in the appropriate low-flow range. However, the flowability of a crystalline resin has a large temperature dependency, and it is difficult to control the temperature which gives the above-described appropriate low-flow range. Further, in the orientation die, because of a temperature gradient caused by the distance from a heat source, a flowability distribution tends to occur, and the shear flow tends to become large. On the other hand, ethylene-ethyl acrylate copolymer (EEA), which is a resin containing an amorphous component, has flowability with a small temperature dependency, and the temperature range which gives the appropriate low-flow range is wide; and thus, temperature control is easily accomplished. Therefore, it is possible to easily use the resin in the low-flow range. Further, even when there is a temperature gradient within the orientation die, since a flowability distribution is reduced from occurring, the shear flow is reduced from becoming large. Thus, by using ethylene-ethyl acrylate copolymer, which is a resin containing an amorphous component, in the low-flow range, the shear flow occurring during magnetic field-press molding is decreased. When the shear flow of the resin is small, ferrite does not have an angle with reference to the axial direction, and orientates along the orientation die. Therefore, it is possible to suppress occurrence of the axial magnetic force of the magnet roller.

Further, the invention of claim 6 is a magnet roller for a developing device according to claim 5 characterized in that the amount of ethyl acrylate (EA) in the ethylene-ethyl acrylate copolymer (EEA) is within 25% to 35%.

In the magnet roller for a developing device of claim 6, the rate of amorphous component in the resin is adjusted by controlling the rate of ethyl acrylate (EA), which is the amorphous component, in ethylene-ethyl acrylate copolymer (EEA). If the rate of ethyl acrylate (EA) in ethylene-ethyl acrylate copolymer (EEA) is low, and the amount of amorphous component is small, the temperature dependency of the flowability of the resin becomes large. Therefore, it is difficult to conduct magnetic field-press molding in a stable low-flow range, and it is not possible to reduce the shear flow. As a result, the ferrite forms an angle with reference to the axial direction, and the axial magnetic force becomes larger than a desired range. Further, since the amount of crystalline component is large, there is a problem in that surface cracking easily occurs during molding, and moldability is impaired. Therefore, by heightening the rate of ethyl acrylate (EA) in ethylene-ethyl acrylate copolymer (EEA) to increase the amount of amorphous component, the thermal dependency of the flowability of the resin becomes small. Thus, it is possible to conduct magnetic field-press molding in a stable low-flow range, and reduce the shear flow. It became clear from experiments that in order to thus reduce the shear flow and keep the occurrence of axial magnetic force within a desired range, it is necessary to set the rate of ethyl acrylate (EA) in ethylene-ethyl acrylate copolymer (EEA) to be 25% or over. However, if the amount of amorphous component becomes too large, since the elasticity of the resin is increased, a variance during molding is large, and this becomes a cause which brings about a variation in shape. In order to obtain such a stability in shape during molding, it became clear from experiments that it is necessary to set the rate of ethyl acrylate (EA) in ethylene-ethyl acrylate copolymer (EEA) to be 35% or below. Therefore, by setting the rate of ethyl acrylate (EA) in ethylene-ethyl acrylate copolymer (EEA) to be within a range of from 25% to 35%, it is possible to obtain a magnet roller which is reduced in axial magnetic force and has a stable shape.

Further, the invention of claim 7 is a magnet roller for a developing device according to either claim 5 or 6 characterized in that a low molecular weight polypropylene (PP) is added as a lubricant.

In the magnet roller for a developing device of claim 7, by adding a low molecular weight polypropylene (PP) as a lubricant, the slip property between the orientation die and the resin becomes better, and it is possible to further reduce the shear flow. Therefore, it is easier to orient ferrite along the orientation die, and it is possible to suppress the axial magnetic force of the magnet roller from occurring.

Further, the invention of claim 8 is a magnet roller for a developing device according to either claim 5, 6 or 7 characterized in that it is molded and manufactured using an orientation die which is given a TiN surface treatment.

In the magnet roller for a developing device of claim 8, by using the orientation die with a TiN surface treatment, friction between the resin and the orientation die becomes small, and it is possible to further reduce the shear flow. Therefore, it is easier to orient ferrite along the orientation die, and it is possible to suppress the axial magnetic force of the magnet roller from occurring.

Further, the invention of claim 9 is a magnet roller for a developing device according to either claim 5, 6 or 7 characterized in that it is molded and manufactured using an orientation die wherein the ratio L/D between the length L and diameter D of the orientation die is from 3.3 to 4.3.

In the magnet roller for a developing device of claim 9, by regulating the ratio between the length L and the diameter D of the orientation die, the shape of the orientation die is such as to easily reduce the shear flow. As described above, when a resin having a low flowability is used, a velocity gradient of the shear flow at the entrance of the orientation die is gradually relieved as the resin flows in the orientation die, and thus, the shear flow is reduced. Thus, in order to obtain enough time for the velocity gradient within the orientation die to be relieved, the ratio between the length L and diameter D of the orientation die is regulated. If the length L of the orientation die against the diameter D of the orientation die is too short, it is not possible to obtain enough time to relieve the velocity gradient of the shear flow. On the other hand, if the length L of the orientation die against the diameter D of the orientation die is too long, the shear flow becomes large because of the frictional force between the orientation die and the resin. Therefore, it is desired for the length L against the diameter D of the orientation die to be in an appropriate range. Experimentally, when a magnet roller was manufactured by using an orientation die wherein the ratio L/D between the length L and diameter D is from 3.3 to 4.3, the shear flow became small, and ferrite oriented along the axial direction, and thus, it was possible to suppress the axial magnetic force of the magnet roller from occurring.

BRIEF DESCRIPTION OF THE DRAWINGS

These and other objects and advantages of the present invention will become clear from the following description with reference to the accompanying drawings, wherein:

FIG. 3(a) is an explanatory diagram showing magnetic field generated in a magnet roller, and FIG. 3(b) is an explanatory diagram which shows the magnetic field distribution of the magnet roller the radial direction and the tangent direction;

FIG. 4 is an explanatory diagram showing the axial magnetic flux density of a magnet roller;

FIG. 5 is an explanatory diagram showing the magnetic field of a magnet roller in a developing device according to one embodiment;

DETAILED DESCRIPTION OF THE PREFERRED EMBODIMENTS

Figure 1:
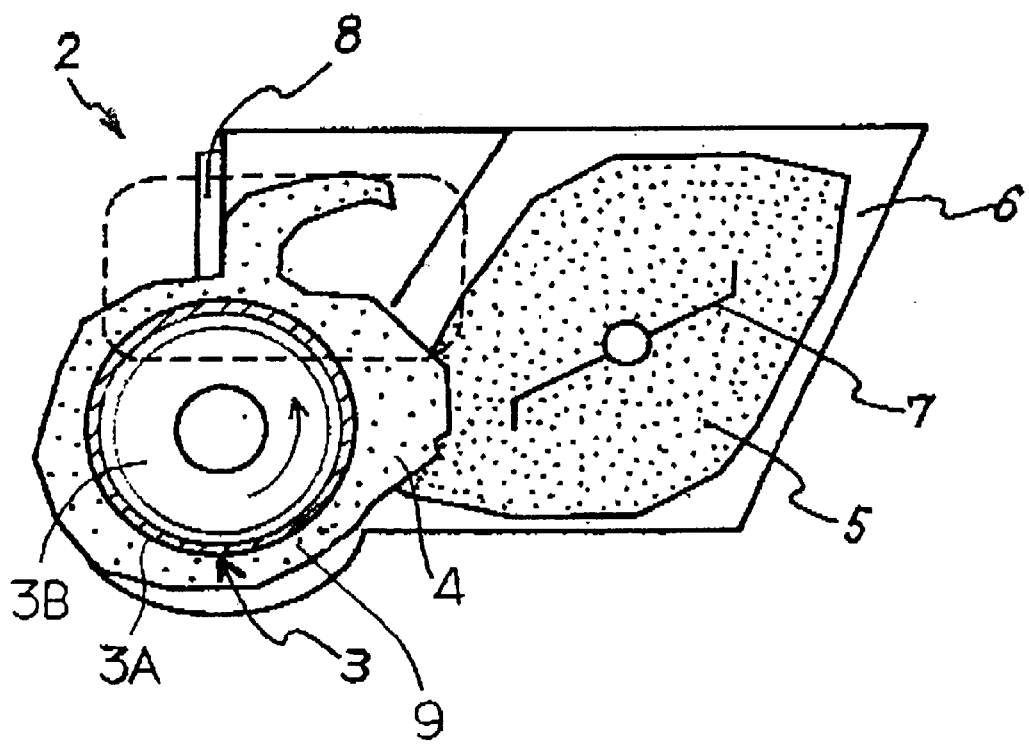
FIG. 1 is a schematic constructional diagram of a developing device according to one embodiment of the present invention.
Figure 2:
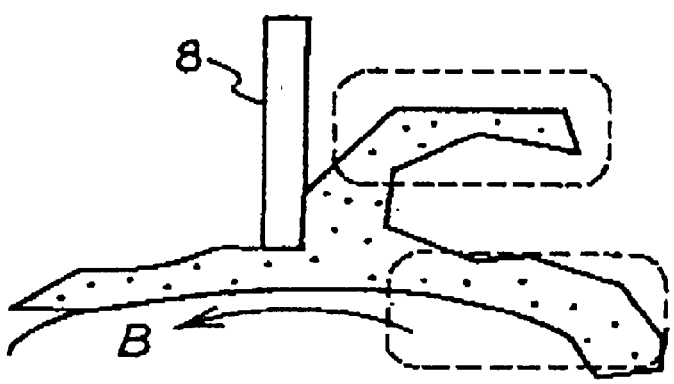
FIG. 2 is an explanatory diagram which shows the movement of a developer in the vicinity of a doctor blade of a developing device according to one embodiment.

Hereinafter, one embodiment of the present invention will be explained. Here, the present invention is applied to a developing device used for an electrophotograph type laser printer (hereinafter referred to as printer) which is an image forming device, and a magnet roller used for the developing device.

FIG. 5 is an explanatory diagram which shows a schematic construction of a developing device 2 according to the present invention, and a magnetic field generated by a developing roller 3. The developing device 2 includes a developing roller 3, a toner tank 6 which receives toner 5 to be supplied to the developing roller 3, an agitator 7 which stirs the toner 5 inside the toner tank 6, and a doctor blade 8 for controlling the amount of developer 4 carried by the developing roller 3. The developing roller 3 is composed of a rotatable cylindrical sleeve 3A, and a magnet roller 3B provided within the sleeve 3A. The magnet roller 3B is fixed, and the sleeve 3A rotates about the axis of the magnet roller 3B. The developer 4 is a two-component developer comprised of a non-magnetic toner 5 and a magnetic carrier 9.

In the magnet roller 3B, there are formed: a magnetic pole (S-pole) P1 in a portion corresponding to a developing region; a magnetic pole (N-pole) P2 in a portion corresponding to a position after passing the developing region; a magnetic pole (S-pole) P3 in a portion corresponding to a position where the toner 5 is supplied; and a magnetic pole (N-pole) P4 in a portion corresponding to the doctor blade 8. FIG. 3(a) is a cross section of a vector of a magnetic force generated by the magnet roller 3B. FIG. 3(b) is a diagram showing the magnetic flux density of the magnet roller 3B in its radial direction of the roller and in its tangent direction.

Next, the operation of the developing device 2 will be explained.

The developer 4 in the developing device 2 is drawn to the magnet roller 3B and carried on the sleeve 3A by means of the magnetic force of magnetic pole P3 in the magnet roller 3B. By the rotation of the sleeve 3A, the developer 4 having been carried is transferred to a position where the doctor blade 8 is located, and the amount of the developer is controlled by the doctor blade 8. Along with the rotation of the sleeve 3A, the developer 4, which has been controlled to a predetermined amount by the doctor blade 8, is transferred to a developing region opposing a photosensitive body 1 functioning as an image carrying body. In the developing region, the developer 4 is napped by the magnetic pole P1, and the developer 4 develops a static latent image on the photosensitive body 1. The developer 4 which was not used in the developing region, that is, the developer 4 which has been controlled by the doctor blade 8 is detached from the sleeve 3A, and is returned to the side in which the toner 5 is supplied (i.e., the bottom side of the toner tank 6). Since such an operation is carried out, the magnetic flux density in both the radial direction of the roller and the tangent direction thereof is kept within an appropriate range.

The toner 5 within the toner tank 6 is stirred by the agitator 7 which rotates in the clockwise direction, and the amount of toner consumed at the developing region is supplied to the developer 4. The toner 5 having been supplied is stirred with the developer 4 by the magnetic force of the magnet roller 3B and the movement of the magnetic carrier 9 caused by the rotation of the sleeve 3A.

Figure 6A:
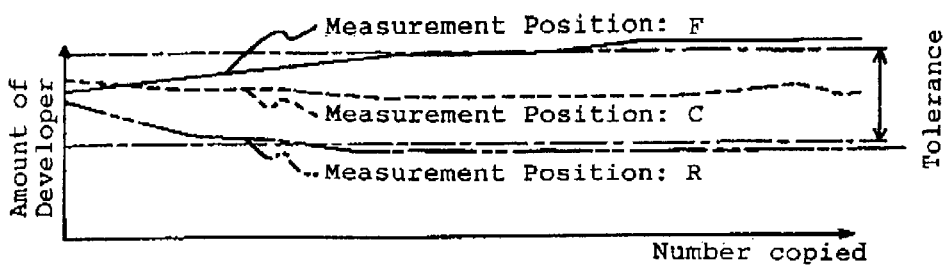
FIG. 6(a) is a diagram showing a bias in the amount of developer when using a magnet roller in which the ratio of an axial magnetic flux density of a magnetic pole P4 to a radial magnetic flux density thereof is 3%.
Figure 6B:
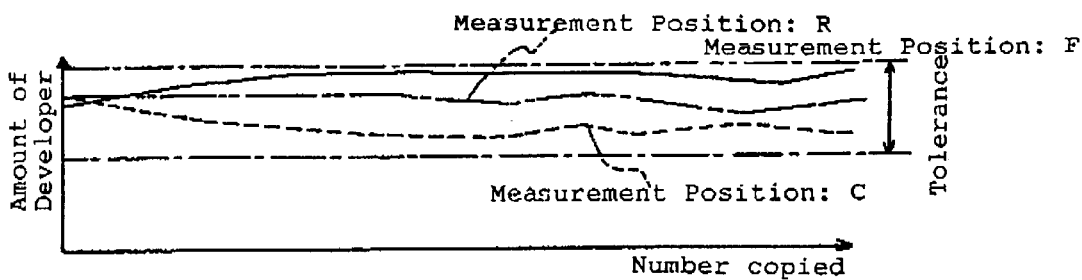
FIG. 6(b) is a diagram showing a bias in the amount of developer when using a magnet roller in which the ratio of an axial magnetic flux density of a magnetic pole P4 to a radial magnetic flux density thereof is 2%.
Figure 6C:
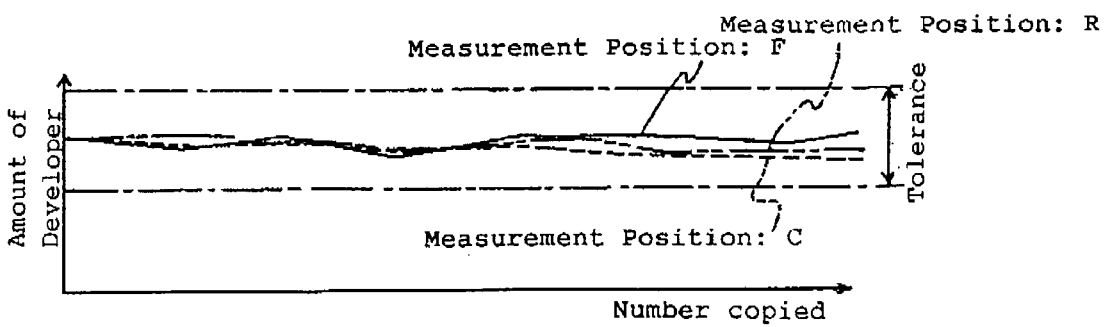
FIG. 6(c) is a diagram showing a bias in the amount of developer when using a magnet roller in which the ratio of an axial magnetic flux density of a magnetic pole P4 to a radial magnetic flux density thereof is 1%.

In the developing device 2 of the present embodiment, there is used a magnet roller 3B wherein the ratio of the axial magnetic flux density to the radial magnetic flux density of the magnetic pole P4 opposing the doctor blade 8 is 2.5% or below in a central portion excluding a portion which is within 30 mm from the end portion of the magnet roller 3. By thus making the axial magnetic force of the magnetic pole P4 small, it is possible to suppress the axial movement of the developer 4 which does not pass by the doctor blade 8, is not held instantly by the sleeve 3A because it comes into collision with the doctor blade 8, and thus, is subjected only to the magnetic force of the magnet roller 3B. Therefore, the bias in the amount of developer carried and in the concentration of the toner over time is kept at a level which causes almost no problem. FIGS. 6(a) through 6(c) show a change in the amount of developer when a continuous development is carried out using a magnet roller 3B wherein the ratio of the axial magnetic flux density to the radial magnetic flux density of the magnetic pole P4 is differed, respectively. FIG. 6(b) shows a change in the amount of developer where there is used a magnet roller in which the ratio of the axial magnetic flux density to the radial magnetic flux density is 2%; and FIG. 6(c) is such where there is used a magnet roller in which the ratio is 1%. FIG. 6(a) is such where there is used a magnet roller in which the ratio of the axial magnetic flux density to the radial magnetic flux density is 3%. As a result, as shown in FIGS. 6(b) and (c), it has been confirmed that, when there is used a magnet roller 3B in which the axial magnetic flux density to the radial magnetic flux density of the magnetic pole P4 is 2% and 1%, respectively, the amount of developer carried in the axial direction is within tolerance, even when a continuous development is carried out. Further, it was possible to form an image being uniform in the axial direction. On the other hand, as shown in FIG. 6(a), with a magnet roller 3B in which the axial magnetic flux density to the radial magnetic flux density of the magnetic pole P4 is 3%, the deviation in the amount of developer being carried goes beyond tolerance over time, and an image being uneven in the axial direction was formed.

Further, as for the magnet roller 3B, there is used a roller in which the ratio of the axial magnetic flux density to the radial magnetic flux density of the magnetic pole P1 corresponding to the developing region is 2.5% or below in a central portion excluding a portion which is within 30 mm from the end portion of the magnet roller 3B. When the axial magnetic force of magnetic pole P1 is reduced in addition to the magnetic pole P4, the developer 4, in the agent build-up portion directly before the developing region, is reduced from being moved in the axial direction. Therefore, the bias of the developer in the axial direction is further reduced from occurring, and it is possible to form an image which is uniform in the axial direction.

Furthermore, as for the magnet roller 3B, there is used a roller in which the ratio of the axial magnetic flux density to the radial magnetic flux density of all of the magnetic poles P1, P2, P3 and P4 is 2.5% or below in a central portion excluding a portion which is within 30 mm from the end portion of the magnet roller 3B. When the axial magnetic force of all of the magnetic, poles is reduced, the developer 4 is reduced from being moved in the axial direction throughout the peripheral direction of the sleeve 3A. Therefore, the bias of the developer in the axial direction is further reduced from occurring, and it is possible to form an image which is uniform in the axial direction.

By using such a developing roller 3, it is possible to prevent the axial bias of the developer from occurring, even in the developing device 2 which is not provided with a developer stirring member for stirring the developer in the axial direction, and which stirs the developer by means of the magnetic force of the magnet roller 3B and the rotation of the sleeve 3A. Therefore, it is possible to provide a developing device which is small in size, and which can form an image being uniform in the axial direction.

An explanation of a method of manufacturing the magnet roller 3B will be made hereinafter.

Figures 7A, 7B, 8:
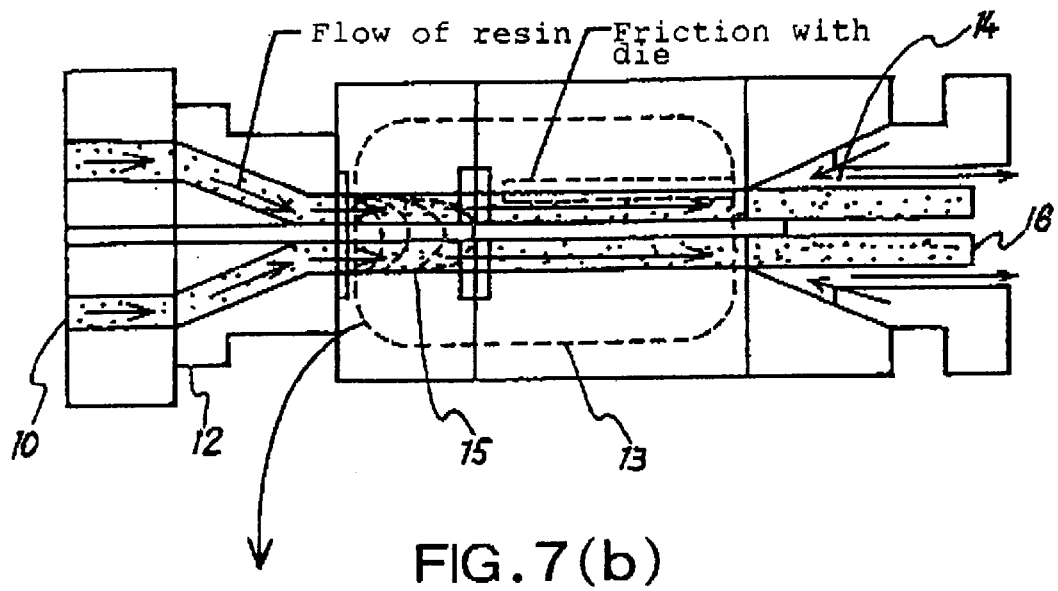
FIG. 7(a) is an explanatory diagram showing a flow of resin when molding a magnet roller by magnetic field-press molding.
FIG. 7(b) is an explanatory diagram showing a flow of resin within an orientation die, and the direction of ferrite.
FIG. 8 is an explanatory diagram showing the relationship between an orientation direction of ferrite and an axial magnetic flux density.

The magnet roller 3B is molded and manufactured according to magnetic field-press molding, where ferrite 11 is oriented within resin 10. FIG. 7(a) is an explanatory diagram showing a flow of resin 10 when the magnet roller 3B is press molded; and FIG. 7(b) is an explanatory diagram of a flow of the resin 10 and the orientation of ferrite 11 within an orientation die 13. In ordinary extrusion molding, when squeezing a mixture of ferrite 11 and resin 10 from a head 12 towards the orientation die 13, the resin 10 flows from the outside towards the central portion; and because of this flow, at the entrance of the orientation die 13, the resin 10 turns into a parallel flow having a velocity gradient, that is, a shear flow 15. Further, within the orientation die 13, when there exists a temperature gradient of the resin 10 or a frictional force with the orientation die 13, these increase the shear flow 15. Because of this shear flow 15, the ferrite 11 in the resin orientates with an angle with reference to the axial direction, and an axial magnetic force is generated in a general magnet roller molded product 16. (See FIG. 8.)

Figure 9:
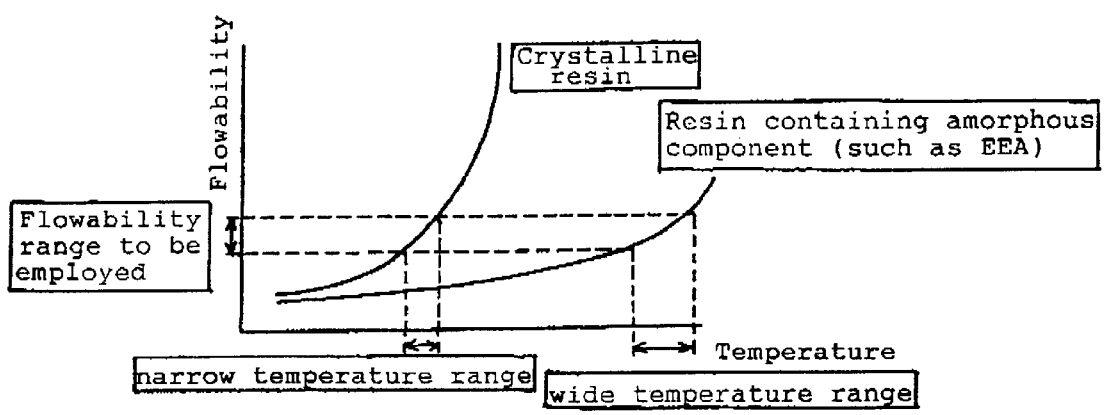
FIG. 9 is an explanatory diagram showing the temperature characteristics of a crystal component of a resin and the flowability thereof.

The axial magnetic force is reduced by molding and manufacturing the magnet roller 3B using a resin which can reduce the shear flow 15 when carrying out magnetic field-press molding. Generally, when the resin 10 is used in an appropriate low-flow range, the velocity gradient occurring at the entrance of the orientation die 13 is gradually relieved, and thus, the shear flow 15 is reduced. That is, in order to reduce the shear flow 15, it is necessary to use the resin 10 in the above-described appropriate low-flow range. FIG. 9 shows a temperature characteristic of flowability of the resin 10. Since the flowability of the resin 10 possesses a temperature characteristic, it is important to control the temperature of the resin 10 in order to use the resin 10 in the appropriate low-flow range. However, the flowability of a crystalline resin has a large temperature dependency, and it is difficult to control the temperature which gives the appropriate low-flow range. Further, in the orientation die 13, because of a temperature gradient caused by the distance from a heat source, a flowability distribution tends to occur, and the shear flow tends to become large. On the other hand, ethylene-ethyl acrylate copolymer (EEA), which is a resin containing an amorphous component, has a flowability with a small temperature dependency, and the temperature range which gives the appropriate low-flow range is wide; and thus, temperature control is easily accomplished. Therefore, it is possible to easily use the resin in the low-flow range. Further, even when there is a temperature gradient within the orientation die 13, since a flowability distribution is reduced from occurring, the shear flow is reduced from becoming large. Thus, by using ethylene-ethyl acrylate copolymer, which is a resin containing an amorphous component, in the low-flow range, the shear flow 15 occurring during magnetic field-press molding is decreased. When the shear flow 15 of the resin 10 is small, ferrite 11 does not have an angle with reference to the axial direction, and orientates along the orientation die 13. Therefore, it is possible to suppress occurrence of the axial magnetic force of the magnet roller 3B.

As described above, magnetic field-press molding is conducted using the orientation die 13, with a magnetic field corresponding to the necessary pole, with a material using ethylene-ethyl acrylate copolymer (EEA) as the resin 10 and mixing 90–92 wt % of Sr ferrite or Ba ferrite as ferrite 11. If the rate of ethyl acrylate (EA) in ethylene-ethyl acrylate copolymer (EEA) is low and the amount of amorphous component is small, the temperature dependency of the flowability of the resin 10 becomes large. Therefore, it is difficult to conduct magnetic field-press molding in a stable low-flow range, and it is not possible to reduce the shear flow 15. As a result, ferrite 11 forms an angle with reference to the axial direction, and the axial magnetic force becomes larger than a desired range. Further, since the amount of crystalline component is large, there is a problem in that surface cracking easily occurs during molding, and moldability is impaired. Therefore, by heightening the rate of ethyl acrylate (EA) in ethylene-ethyl acrylate copolymer (EEA) to increase the amount of amorphous component, the thermal dependency of the flowability of the resin 10 becomes small. Thus, it is possible to conduct magnetic field-press molding in a stable low-flow range, and reduce the shear flow 15. It became clear from experiments that in order to thus reduce the shear flow 15 and keep the occurrence of axial magnetic force within a desired range, it is necessary to set the rate of ethyl acrylate (EA) in ethylene-ethyl acrylate copolymer (EEA) to be 25% or over. However, if the amount of amorphous component becomes too large, since the elasticity of the resin 10 is increased, a variance during molding is large, and this becomes a cause which brings about a variation in shape. In order to obtain such a stability in shape during molding, it became clear from experiments that it is necessary to set the rate of ethyl acrylate (EA) in ethylene-ethyl acrylate copolymer (EEA) to be 35% or below. Therefore, by setting the rate of ethyl acrylate (EA) in ethylene-ethyl acrylate copolymer (EEA) to be within a range of from 25% to 35%, it is possible to obtain a magnet roller which is reduced in axial magnetic force and has a stable shape.

Further, by adding a low molecular weight polypropylene (PP) as a lubricant, the slip property against the orientation die 13 becomes better, and it is possible to further reduce the shear flow 15. Further, in order to enhance heat resistance, it is possible to add a phosphorus-based or phenol-based antioxidant.

Furthermore, by using an orientation die 13 which is given a TiN surface treatment, the friction between the resin 10 and the orientation die 13 becomes small, and it is possible to further reduce the shear flow 15.

Further, according to the shape of the orientation die 13, it is possible to easily reduce the shear flow 15. When ethylene-ethyl acrylate copolymer (EEA) is used, a velocity gradient of the shear flow 15 at the entrance of the orientation die 13 is gradually relieved as the resin flows in the orientation die 13, and thus, the shear flow 15 is reduced. Thus, in order to obtain enough time for the velocity gradient within the orientation die 13 to be relieved, the ratio between the length L and diameter D of the orientation die 13 is regulated. If the length L of the orientation die 13 against the diameter D of the orientation die 13 is too short, it is not possible to obtain enough time to relieve the velocity gradient of the shear flow 15. On the other hand, if the length L of the orientation die 13 against the diameter D of the orientation die 13 is too long, the shear flow becomes large because of the frictional force between the orientation die 13 and the resin 10. Therefore, it is desired for the length L against the diameter D of the orientation die 13 to be in an appropriate range. Experimentally, when a magnet roller 3 was manufactured by using an orientation die 13 wherein the ratio L/D between the length L and diameter D is from 3.3 to 4.3, the shear flow 15 became small, and ferrite 11 oriented along the axial direction, and thus, it was possible to suppress the axial magnetic force of the magnet roller 3 from occurring.

As discussed above, the present invention was explained according to a developing device which uses a two-component developer, and a magnet roller used therefor. However, the present, invention is applicable to a developing device using a magnetic developer, and a magnet roller used therefor, and the same effect can be obtained.

According to the invention of claims 1 to 4, there is an excellent effect that it is possible to provide a developing device which is capable of preventing bias of a developer caused by axial magnetic force of a magnet roller, and forming an image which is uniform in the axial direction.

Particularly, according to the invention of claim 4, there is an excellent effect that it is possible to provide a developing device which is small in size and forms an image which is uniform in the axial direction.

Further, according to the invention of claims 5 to 9, there is an excellent effect that it is possible to provide a magnet roller for a developing device which has a reduced axial magnetic forcer.

Particularly, according to the invention of claim 6, there is an excellent effect that it is possible to provide a magnet roller which has a reduced axial magnetic force, and which shape is stable.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A developing device comprising:
   a rotatable sleeve configured to carry a developer on the surface thereof;
   a fixed magnet roller provided within the sleeve and having a plurality magnetic poles; and
   a developer control member configured to control the amount of developer carried on the sleeve,
   wherein among the plurality of magnetic poles of said magnet roller, a ratio of an axial magnetic flux density to a radial magnetic flux density of a magnetic pole opposing said developer control member is 2.5/100 or less in a central portion in the axial direction.

2. The developing device according to claim 1, wherein among the magnetic poles of said magnet roller, a ratio of the axial magnetic flux density to a radial magnetic flux density of a magnetic pole to be a developing pole is 2.5/100 or less in the central portion in the axial direction.

3. The developing device according to claim 1, wherein a ratio of the axial magnetic flux density to a radial magnetic flux density of each of the magnetic poles of said magnet roller is 2.5/100 or less in the central portion in the axial direction.

4. The developing device according to any one of claims 1 to 3, wherein the developing device does not comprise a developer stirring member for stirring the developer in the axial direction.

5. A magnet roller used in the developing device according to claim 1, wherein said magnet roller is molded and manufactured by orienting ferrite into ethylene-ethyl acrylate copolymer (EEA) according to magnetic field-press molding.

6. The magnet roller for a developing device according to claim 5, wherein the amount of ethyl acrylate (EA) in the ethylene-ethyl acrylate copolymer (EEA) is from 25% to 35%.

7. The magnet roller for a developing device according to claim 5, wherein a low molecular w eight polypropylene (PP) is added as a lubricant.

8. The magnet roller for a developing device according to claim 5, wherein said magnet roller is molded and manufactured using an orientation die which is given a TiN surface treatment.

9. The magnet roller for a developing device according to claim 5, wherein said magnet roller is molded and manufactured using an orientation die wherein the ratio L/D between the length L and diameter D of the orientation die is from 3.3 to 4.3.

10. A magnet roller used in the developing device according to claim 2, wherein said magnet roller is molded and manufactured by orienting ferrite into ethylene-ethyl acrylate copolymer (EEA) according to magnetic field-press molding.

11. A magnet roller used in the developing device according to claim 3, wherein said magnet roller is molded and manufactured by orienting ferrite into ethylene-ethyl acrylate copolymer (EEA) according to magnetic field-press molding.

12. A magnet roller used in the developing device according to claim 4, wherein said magnet roller is molded and manufactured by orienting ferrite into ethylene-ethyl acrylate copolymer (EEA) according to magnetic field-press molding.

13. The magnet roller for a developing device according to claim 6, wherein a low molecular weight polypropylene (PP) is added as a lubricant.

14. The magnet roller for a developing device according to claim 6, wherein said magnet roller is molded and manufactured using an orientation die which is given a TiN surface treatment.

15. The magnet roller for a developing device according to claim 7, wherein said magnet roller is molded and manufactured using an orientation die which is given a TiN surface treatment.

16. The magnet roller for a developing device according to claim 6, wherein said magnet roller is molded and manufactured using an orientation die wherein the ratio L/D between the length L and diameter D of the orientation die is from 3.3 to 4.3.

17. The magnet roller for a developing device according to claim 7, wherein said magnet roller is molded and manufactured using an orientation die wherein the ratio L/D between the length L and diameter D of the orientation die is from 3.3 to 4.3.

* * * * *